May 15, 1951  J. H. GRUBE  2,553,188
RUBBER SPRING AND AXLE ASSEMBLY
Filed Nov. 5, 1946
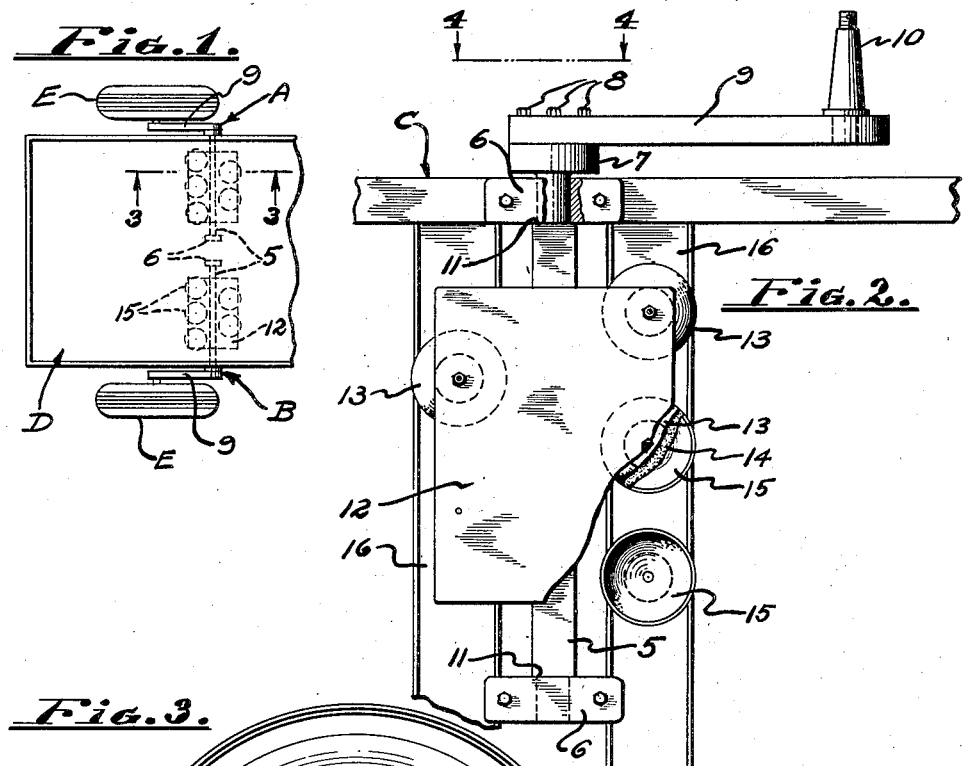
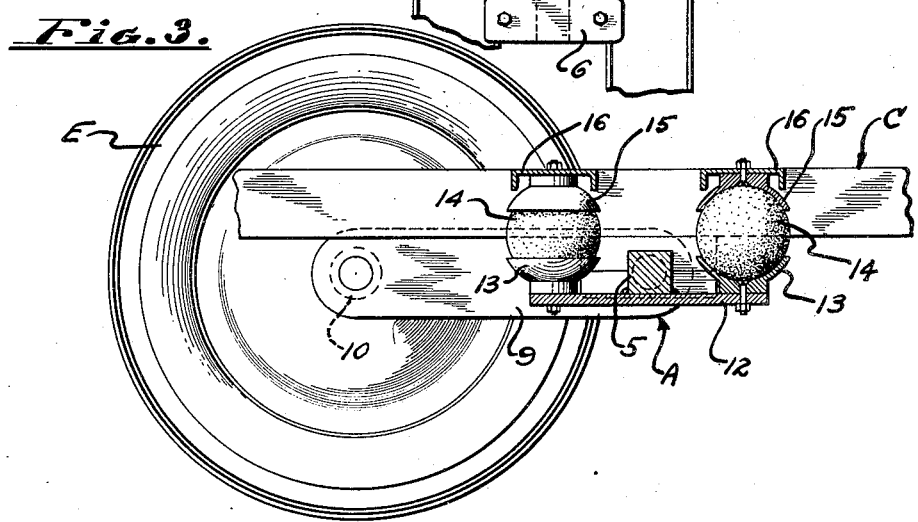
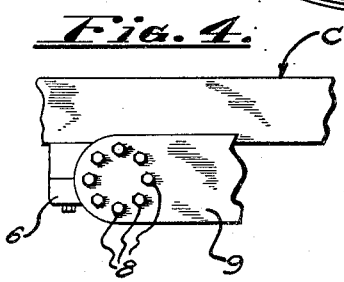
Inventor
JOHN H. GRUBE
By R. S. Berry
Attorney Patented May 15, 1951

2,553,188

UNITED STATES PATENT OFFICE 2,553,188

RUBBER SPRING AND AXLE ASSEMBLY

John H. Grube, Pasadena, Calif., assignor, by mesne assignments, to Overniter Manufacturing Corporation, a corporation of California Application November 5, 1946, Serial No. 707,888

2 Claims. (Cl. 267—21)

This invention relates in general to vehicle axle units and more particularly pertains to an improved spring and axle assembly which is especially adapted for trailers and the like but may be used to advantage with various types of vehicles.

This invention resides in the provision of an axle assembly and a spring assembly which are constructed, arranged and combined in such manner as to afford the objects and advantages as follows:

1. Individual mounting and spring suspension of each wheel through the medium of a small, compact and inexpensive spring and axle unit which effectively cushions and absorbs all shocks, jars and vibrations occasioned with the use of a vehicle equipped with the assembly hereof.

2. The provision for quickly and easily mounting the wheels forwardly or rearwardly of the part of the axle unit secured to the vehicle frame, without changing the location of the axle, as well as the provision for as readily setting the spindles at various elevations for fixing the vehicle body at different heights from the ground without bodily shifting the vehicle-attached part of the axle whereby the clearance of the vehicle body from the ground may be varied over a wide range best to suit the terrain to be traversed.

3. A greater clearance of the spring-axle assembly from the ground than ordinarily provided with bowed spring axle-supported units.

4. A novel spring and axle arrangement wherein a most effective cushioning and shock absorbing and snubbing action per each wheel is achieved with a plurality of spherical rubber elements arranged to yield and provide the aforesaid action responsive to turning of the associated axle in either direction as when the associated wheel supported on a crank arm extension of the axle is raised and lowered responsive to all road irregularities and all relative movements of the vehicle and wheels.

5. Provision for automatic turning of the spherical rubber spring elements incident to the yielding and spring action thereof so as to avoid spot wear and assure an even wear of such elements thereby increasing the life thereof.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary top plan view of a vehicle as equipped with a spring and axle assembly embodying the present invention.

Fig. 2 is an enlarged fragmentary bottom plan view of one unit of the assembly showing how it is mounted on the vehicle, the associated wheel being omitted.

Fig. 3 is an enlarged fragmentary sectional view taken on the plane of the line 3—3 of Fig. 1, and Fig. 4 is a fragmentary side elevational view of the part of apparatus encompassed by the line and arrows 4—4 of Fig. 2.

As shown in the accompanying drawing, a spring and axle assembly embodying the present invention generally comprises like axle-spring units A and B adapted to be fixed to opposite sides of the frame C of a vehicle D such as a trailer so that like wheels E may be individually supported for relative movement against the action of the respective spring elements of said units.

Each of the axle and spring units A and B includes an axle 5 supported so that it may be turned in like bearings 6 fixed to the vehicle frame C. On its outer end this axle is provided with a circular head 7 to which is adjustably secured by means of an annular series of stud bolts 8, a crank arm 9 which supports a spindle 10 for one of the wheels E. The portion of the axle between the bearings 6 is of square cross section whereas the portions in the bearings are round thus providing shoulders 11 which abut the bearings and hold the axle against axial displacement from the bearings and thus maintain the axle unit securely in place while permitting the axle 5 to turn in said bearings.

As here provided the spring arrangement of each of the units A and B includes a rectangular rocker plate 12 welded or otherwise fixed to the axle 5 so as to extend forwardly and rearwardly therefrom substantially an equal amount. Along the longitudinal (forward and rear) edges of this plate are fixed like rigid cup members 13 in and by which spherical resilient rubber members 14 are seated and held for like association with corresponding cups 15 fixed to cross members 16 of the vehicle frame C. These cup members embrace the spherical rubber spring members so as to provide means for holding them in place subject to compression and spring action responsive to turning of the shaft 5 in either direction.

As here provided a greater number of the spherical spring members 14 are placed along the rear edge of the rocker plate 12 than along the front or forward edge, as best shown in Fig. 1, inasmuch as the assembly as here shown is installed so that the compression load is carried by the row of three spherical members along the rear edge of said rocker plate while the two spherical members on the front edge of said plate take care of the rebound with a snubbing action. It is to be understood however that any number of spherical elements may be used on either side of the axle as best to suit the particular vehicle and conditions at hand.

With the axle-spring assembly installed as shown in the accompanying drawing, the crank arms 9 are secured to the outer ends of the axles 5 so as to be normally substantially horizontally disposed but subject to swinging upwardly and downwardly responsive to the road action and the load action of the wheels and vehicle body, in all cases against the cushioning, shock absorbing and snubbing action of the sets of spherical rubber spring elements 14. However, upon removing the stud bolts 8 the crank arms 9 may be reset on the axles so that they are normally inclined downwardly or upwardly from the horizontal for the purpose of raising the vehicle body or lowering it relative to the ground as desired. Moreover the crank arms 9 may be set to extend rearwardly of the axles instead of forwardly and all such adjustments may be readily and easily made without disturbing the axles 5 and associate rubber spring units.

Where rough and bumpy roads or ground is to be negotiated the crank arms 9 may be set in downwardly inclined position to raise the body of the vehicle well above the ground as desired. Where a lower position of the body is desired as may be the case for some trailers and vehicles in which a lower center of gravity is indicated, a setting of the crank arms in an upwardly inclined position may be effected as desired. Likewise the crank arms 9 may be set to extend either forwardly or rearwardly of the axles best to suit the particular trailer or vehicle, for better weight distribution and to accommodate the assembly to the best position on vehicles of different lengths.

Another feature of advantage present in the rubber spring units is that the spherical rubber elements 14 due to angular compression thrusts being applied thereto incident to the road action and the load action of the wheels and vehicle body, will cause the rubber elements to turn in the retaining cups therefor whereby spot wear and deterioration of the rubber will be prevented and the life of the rubber elements prolonged.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In an axle assembly for vehicles, an axle, bearing means for securing the axle to the vehicle so that the axle may turn about its axis, a crank arm fixed to the outer end of said axle, a wheel-supporting spindle carried by said crank arm and spring means yieldingly resisting the turning movement of said axle including a rocker member fixed to said axle and extending forwardly and rearwardly therefrom, spherical resilient rubber spring members, and means mounted on the vehicle and on said rocker member for retaining said spherical rubber members on said rocker member subject to yieldingly resisting rocking movement of said rocker member including cup members in which said rubber members are free to turn.

2. In an axle assembly for vehicles, an axle, bearing means for securing the axle to the vehicle so that the axle may turn about its axis, a crank arm fixed to the outer end of said axle, a wheel-supporting spindle carried by said crank arm and spring means yieldingly resisting the turning movement of said axle including a rocker member fixed to said axle and extending forwardly and rearwardly therefrom, spherical resilient rubber spring members, and means mounted on the vehicle and on said rocker member for retaining said spherical rubber members on said rocker member subject to yieldingly resisting rocking movement of said rocker member, said spherical rubber members being turnable in said retaining means.

JOHN H. GRUBE.

REFERENCES CITED

The following references are of record in the file of this patent:

UNITED STATES PATENTS

| Number | Name | Date |
| --- | --- | --- |
| 897,270 | Chapin | Sept. 1, 1908 |
| 1,425,616 | Tarbox | Aug. 15, 1922 |
| 2,002,377 | Mayne | May 21, 1935 |
| 2,167,911 | Schieferstein | Aug. 1, 1939 |
| 2,371,864 | Woolson et al. | Mar. 20, 1945 |
| 2,396,579 | Krotz | Mar. 12, 1946 |

FOREIGN PATENTS

| Number | Country | Date |
| --- | --- | --- |
| 772,052 | France | Aug. 6, 1934 |
| 648,974 | Germany | Aug. 12, 1937 |